Feb. 12, 1924. Re. 15,761

J. F. ROSE

AUTOMATIC BEARING ADJUSTER

Original Filed March 21, 1921

Witness:
Dave S. Magnuson.

Inventor:
John F. Rose.
By Sprinkle & Smith
Attys.

Reissued Feb. 12, 1924. Re. 15,761

UNITED STATES PATENT OFFICE.

JOHN F. ROSE, OF DAVENPORT, IOWA, ASSIGNOR TO KIL-NOCK COMPANY, A CORPORATION OF ILLINOIS.

AUTOMATIC BEARING ADJUSTER.

Original No. 1,453,152, dated April 24, 1923, Serial No. 453,932, filed March 21, 1921. Application for reissue filed August 15, 1923. Serial No. 657,645.

*To all whom it may concern:*

Be it known that I, JOHN F. ROSE, a citizen of the United States, residing at Davenport, in the county of Scott and State of Iowa, have invented certain new and useful Improvements in Automatic Bearing Adjusters, of which the following is a specification.

My invention relates to a device for automatically taking up the wear on bearing parts, and is particularly adapted for use in connection with automatically taking up the wear on a crank shaft and pitman connection in an internal combustion engine and the like. Of course, the invention is capable of other uses where the automatic take-up of wear between operating parts is essential to the efficient operation and life of those parts.

One of the objects of the present invention is to provide an efficient automatic take-up to compensate for wear on the wearing parts.

A further object of the invention is to provide an automatic take-up to compensate for wear on bearing parts wherein the space for operating such a device is limited.

A further object of the invention is to provide a device of the character described which is simple in construction and efficient in operation.

These and other objects are obtained by providing a construction and an arrangement of the various parts in a manner hereinafter described and particularly pointed out in the appended claims.

Referring to the drawings, Fig. 1 is a side elevational view partly in section of a crank shaft and pitman connection bearing showing my improved automatic take-up mounted therein.

Figure 1:
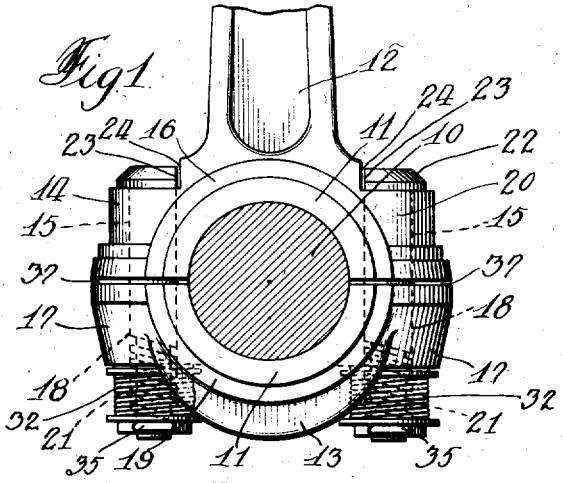
Figure 2:
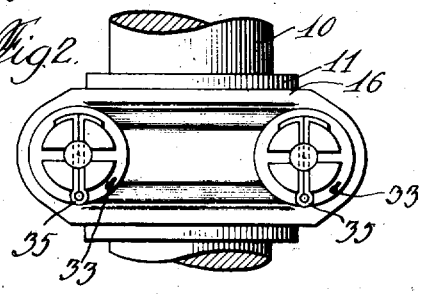
Fig. 2 is a bottom plan view of Fig. 1.
Figure 3:
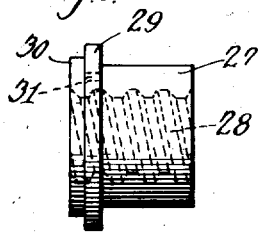
Fig. 3 is an enlarged detail view of the adjusting nut or sleeve.
Figure 4:
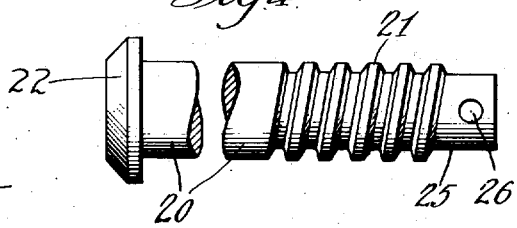
Fig. 4 is an enlarged detail view of the adjusting bolt.
Figure 5:
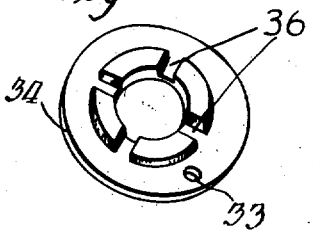
Fig. 5 is an enlarged detail view of the adjustable washer.

The invention hereinafter described and claimed is particularly adapted for use in connection with automatically taking up the wear on a crank shaft and pitman connection and has particular reference to a construction in which the space in which the crank shaft is operating is limited. In other words, the crank shaft and pitman connection is ordinarily encased in a crank shaft casing where the space between the wall of the crank shaft casing and the revolving parts of the crank shaft and pitman connection is but a small fractional part of an inch and does not afford very much room for the provision of a device for automatically taking up the wear on these bearing parts. In carying out my invention I have shown the same in connection with a crank shaft 10 having pivotally connected therewith by means of a split bearing bushing 11 a pitman connection 12 and a removable cap 13. The pitman connection 12 is provided with the usual laterally extending lugs 14 formed integrally on the opposite sides thereof, which are provided with the usual apertures 15 extending vertically therethrough. The pitman is further provided with a laterally extending semi-circular flange 16, which is adapted to receive and support half of the split bearing bushing 11. Secured to the pitman 12 for forming the other half of the bearing connection to the crank shaft 10 is a cap 13 which is provided with lugs 17 on the opposite sides thereof corresponding to the lugs 14 of the pitman 12. These lugs are provided with apertures 18 which are adapted to register with corresponding apertures 15 in the lugs 14 of the pitman 12. The cap 13 is further provided with a semi-circular flange portion 19 corresponding with the semi-circular flange portion 16 of the pitman 12 and is adapted to support and retain therein a semi-circular portion of the split bushing 11 in such a manner as to form a bearing for the crank shaft 10 when the cap is properly positioned on or secured to the pitman 12. The means ordinarily used to secure the cap 13 to the pitman 12 on the shaft 10 are not adjusted automatically to compensate for the wear between the shafts 10 and the bushing, and for this reason the bearing becomes loose and causes excess strain on the bearing parts, thereby shortening the life of the parts. As previously pointed out, the space between the crank case and the revolving crank shaft and pitman is considerably limited and will not permit the use of an ordinary means for taking up the wear on these parts. In this connection I have provided a novel form of construction of an automatically actuated take-up for taking up the wear on the bearing parts. This device is simple in construction and compact in form so that it occupies slightly more space than the ordinary nut. This construction comprises a bolt 20 provided with the screw threads 21 having a relatively long pitch. One end of the bolt is provided with a head 22 having one portion thereof as shown at 23, cut off so as to abut against a shoulder 24 formed on the pitman 12. This prevents the bolt when in place from turning with respect to the pitman. On the end of the bolt opposite the head is an unthreaded portion 25 provided with a transverse aperture 26. The bolt 20 is secured in position in the aligned apertures 15 and 18 of the lugs 14 and 17, respectively, by a sleeve 27. The sleeve 27 is interiorly threaded, as shown at 28, for engagement with threaded portion 21 of the bolt 20. The sleeve 27 is provided with a peripherally arranged flange 29 which is slightly spaced from one edge 30 thereof. Extending longitudinally through the flange 29 is an aperture 31. The aperture 31 is adapted to engage one end of a spiral spring 32. The spring 32 is mounted upon the sleeve 27 which centrally maintains the spring on the bolt. The other end of the spring is secured in an aperture 33 formed in an adjustable washer 34, which is mounted on the unthreaded portion 25 of the bolt 20. One side of the washer 34 is seated on the thread adjacent the unthreaded portion 25 of the bolt 20. The washer 34 is locked in relative positions of adjustment by a cotter pin 35 which extends through slots or grooves 36 of the washer 34 and through the aperture 26 of the bolt 20. With this arrangement it will be noted that the sleeve 27 extends substantially throughout all the coils of the spring 32 thereby centrally maintaining and supporting the spring on the sleeve and also providing a compactly arranged, automatically actuated bearing adjuster. In arranging the spring and sleeve in this manner my improved automatic bearing adjuster may be used in connection with crank shaft bearings where the space between the crank shaft and crank shaft case is limited.

From the above description, it will be seen that the washer 34 may be revolved in a direction to exert a torsional thrust on the spring 32, which in turn exerts a torsional thrust on the sleeve 27, and thereby automatically takes up the wear on these parts. It will be noted that the flange 29 is spaced from the face 30 of the sleeve 27 so that one end of the spring 32 extending through aperture 31 of the flange 29 will not be clamped between the flange and the lugs 17 of the cap 13 so as to prevent the rotation of the sleeve.

In the operation of the above described device, it will of course be understood that when the cap 13 is placed in position so that the apertures 15 and 18 of the pitman 12 and cap 13, respectively, register, and with the crank shaft 10 positioned between the split bushings 11, there is a space of substantially one-sixteenth of an inch, as shown at 37, between these bearing parts so that the wear on these bearing parts may be taken up by my improved device as wear ensues. When the bolt 20 is positioned in these apertures 15 and 18 of the lugs 14 and 17 respectively, the sleeve 27 is screwed on the threaded portion of the bolt so that the surface 30 thereof engages the outer surface of the lug 17. One end of the spring 32 is then engaged in the aperture 31 with the remaining coils surrounding the sleeve 27. Then the adjustable washer 34 is positioned on the unthreaded portion 25 of the bolt 20 with the aperture 33 of the washer engaging the other end of the spring, and when the sleeve 27 is screwed down so that the surface 30 engages the outer surface of the lug 17 the spring through the medium of the washer is put under a torsional thrust and the cotter pin 35 is then inserted through the grooves 36 of the washer and the aperture 26 of the bolt, thereby securing the sleeve in position under a torsional strain.

From the above construction it will be seen that by having the spring surrounding the barrel of the sleeve 27 I have provided an automatically adjusting device which is very compact, simple and efficient, and which will work within a very limited space and is especially adapted for use in connection with crank shafts and pitman constructions where the space between the crank shaft casing and the crank shaft and pitman connection is limited.

While in the above specification I have described one embodiment which my invention may assume in practice, it will of course, be understood that the same is capable of modification and that modification may be made without departing from the spirit and scope of the invention, as expressed in the following claims.

What I claim as my invention and desire to secure by Letters Patent is:

1. A device of the character described comprising a threaded bolt, a sleeve having an interiorly threaded bore arranged to receive said bolt, said bolt having an unthreaded portion at one end thereof, an adjustable washer mounted on the unthreaded portion of said bolt, and a torsional spring mounted on said sleeve having one end connected to said sleeve and the other end thereof connected to said washer, said sleeve extending substantially throughout all the coils of said spring, thereby supporting the coils thereof and limiting the space occupied by said spring and sleeve.

2. In a device of the character described, a threaded bolt having an opening extending transversely therethrough and adjacent the outer end thereof, a sleeve having an interiorly threaded bore arranged to receive said threaded bolt, said sleeve having a radial flange on the peripheral wall thereof, an adjustable washer having radial grooves on the upper face thereof, a torsion spring arranged to lie concentric with said sleeve on said bolt and engage said flange at one end and said washer at the other end, and a pin projected through the opening in said bolt and arranged to engage the grooves in said washer to normally prevent the rotation of said washer on said bolt.

3. A device of the character described comprising a threaded bolt, a sleeve having an interiorly threaded bore arranged to receive said bolt, and a torsional spring mounted on said sleeve having one end connected to said sleeve and the other end connected with said bolt, said sleeve extending substantially throughout all the coils of said spring, thereby supporting the coils thereof and limiting the space occupied by said spring and sleeve.

4. A device of the character described comprising a threaded bolt, a sleeve having an interiorly threaded bore arranged to receive said bolt, and a torsional spring mounted on said sleeve having one end connected to said sleeve, said sleeve extending substantially throughout all the coils of said spring, thereby supporting the coils thereof and limiting the space occupied by said spring and sleeve, and means for connecting the other end of the spring with said bolt and for locking the sleeve against removal from the bolt.

In testimony whereof I affix my signature.

JOHN F. ROSE.